United States Patent
Morris (10) Patent No.: US 10,187,247 B2
(45) Date of Patent: *Jan. 22, 2019

(54) COMPUTER SYSTEM AND METHOD FOR SHARING COMPUTER MEMORY

(75) Inventor: Terrel Morris, Garland, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 578 days.

This patent is subject to a terminal disclaimer.

(21) Appl. No.: 13/813,258

(22) PCT Filed: Jul. 30, 2010

(86) PCT No.: PCT/US2010/043936
§ 371 (c)(1),
(2), (4) Date: Jan. 30, 2013

(87) PCT Pub. No.: WO2012/015430
PCT Pub. Date: Feb. 2, 2012

(65) Prior Publication Data
US 2013/0132587 A1    May 23, 2013

(51) Int. Cl.
*H04L 29/08* (2006.01)
*G06F 13/16* (2006.01)

(52) U.S. Cl.
CPC .... *H04L 29/08171* (2013.01); *G06F 13/1657* (2013.01); *H04L 67/1008* (2013.01)

(58) Field of Classification Search
CPC .............. H04L 29/06; H04L 29/08072; H04L 29/0809; H04L 29/08144; H04L 63/08;
(Continued)

(56) References Cited

U.S. PATENT DOCUMENTS 6,505,275 B1    1/2003  Weissman et al.
7,149,855 B2    12/2006  Chen et al.
(Continued)

FOREIGN PATENT DOCUMENTS

KR    10-2002-0078172    10/2002
KR    10-2007-0071849    7/2007
(Continued)

OTHER PUBLICATIONS

Free Online Encyclopedia, "SMP," http://encyclopedia2.thefreedictionary.com/p/SMP, 2009, (3 pages).
(Continued)

Primary Examiner — Backhean Tiv
Assistant Examiner — Mehulkumar J Shah
(74) Attorney, Agent, or Firm — Tong, Rea, Bentley & Kim, LLC (57) ABSTRACT

A computer system has a plurality of computer servers, each including at least one central processing unit (CPU). A memory appliance is spaced remotely from the plurality of computer servers. The memory appliance includes a memory controller and random access memory (RAM). At least one photonic interconnection is between the plurality of computer servers and the memory appliance. An allocated portion of the RAM is addressable by a predetermined CPU selected during a configuration event from the plurality of computer servers.

11 Claims, 5 Drawing Sheets

(58) Field of Classification Search
CPC ........... H04L 29/08171; H04L 67/1008; H04L 29/08; H04L 12/5695; G06F 13/1657
USPC .................. 709/225, 226, 223; 710/107, 36; 711/150
See application file for complete search history.

(56) References Cited

U.S. PATENT DOCUMENTS

| | | | |
|---|---|---|---|
| 7,231,504 B2 | 6/2007 | Kashyap et al. | |
| 7,437,521 B1 | 10/2008 | Scott et al. | |
| 7,966,455 B2* | 6/2011 | Borkenhagen | G06F 12/08 711/128 |
| 9,710,426 B2* | 7/2017 | Morris | G06F 15/17331 |
| 2001/0047512 A1 | 11/2001 | Szewerenko et al. | |
| 2002/0038401 A1* | 3/2002 | Zaidi | G06F 13/28 710/305 |
| 2004/0264112 A1* | 12/2004 | Koehler | H05K 7/1457 361/600 |
| 2005/0050293 A1 | 3/2005 | Falk et al. | |
| 2005/0172008 A1 | 8/2005 | Claudatos et al. | |
| 2006/0004963 A1 | 1/2006 | Mattina et al. | |
| 2007/0268926 A1 | 11/2007 | Nakagawa et al. | |
| 2008/0059782 A1* | 3/2008 | Kruse | G06F 8/63 713/1 |
| 2008/0222351 A1* | 9/2008 | Verdiell | G06F 13/4234 711/104 |
| 2009/0279341 A1 | 11/2009 | Forrest et al. | |
| 2009/0296719 A1 | 12/2009 | Maier et al. | |
| 2009/0300299 A1 | 12/2009 | Maier et al. | |
| 2010/0322562 A1* | 12/2010 | Barnes | G02B 6/3885 385/59 |
| 2011/0072204 A1* | 3/2011 | Chang | G06F 12/0284 711/103 |
| 2011/0179162 A1* | 7/2011 | Mayo | G06F 9/5077 709/224 |

FOREIGN PATENT DOCUMENTS

| | | |
|---|---|---|
| TW | 200615755 A | 5/2006 |
| WO | WO-2010002411 | 1/2010 |

OTHER PUBLICATIONS

International Search Report, dated Apr. 29, 2011, PCT Application No. PCT/US2010/043936, filed Jul. 30, 2010.
Katayama, Y. et al. "Optical interconnect opportunities for future server memory systems." High Performance Computer Architecture, 2007. HPCA 2007. IEEE 13th International Symposium on. IEEE, 2007.
Lim, K. et al, "Disaggregated Memory for Expansion and Sharing in Blade Servers," ISCA 2009, Jun. 20-24, 2009, Austin, Texas, pp. 267-278.
Tremaine, R.B. et al., "IBM Memory Expansion Technology (MXT)," IBM J Res & Dev, vol. 45, No. 2, Mar. 2001, pp. 271-285.

* cited by examiner

COMPUTER SYSTEM AND METHOD FOR SHARING COMPUTER MEMORY

BACKGROUND

The present disclosure relates generally to connection of memory appliances for computer systems.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

A typical central processing unit (CPU) in a computer system may logically address many times the number of memory locations than it can physically control. For example, many CPUs can logically address between 2 TB (2000 GB) and 4 TB (4000 GB) of memory, but can only physically control 128 GB. The fundamental constraints on the number of memory locations are the input/output (I/O) pin count and the power required to directly sustain multiple Double Data Rate (DDR) busses from a single CPU. State-of-the-art CPUs limit their glueless (not using a secondary switching/coherency connectivity hierarchy) connectivity to a domain of 8 processors, and each processor can only control an extreme subset of what it can address. Thus, using processors as memory controllers may be a relatively expensive means for both addressing and controlling a large amount of memory.

Symmetric MultiProcessing (SMP) is a computer system architecture in which a plurality of CPUs shares the same memory. SMP systems provide scalability. As business increases, additional CPUs can be added to absorb the increased transaction volume. The number of CPUs in SMP systems may range from at least two to more than 32 CPUs. SMP architectures allow large amounts of memory to be addressed by each CPU by conjoining many CPUs with a proprietary switching fabric employing a consistent memory coherency scheme over the entire complex. This solution is 1) relatively complex, 2) expensive, 3) adds significant latency, and 4) is not well suited to certain applications, including searching.

DDR expansion schemes have also been used to increase memory available to CPUs. An example of a DDR expansion scheme includes Load Reduced Dual in-line Memory Modules (LRDIMMs). LRDIMMs may increase overall server system memory capacity and speed using a memory buffer chip or chips as opposed to a register. The LRDIMM solutions typically increase the controllable amount of memory by single-digit factors, while creating high-power custom DIMMs that may be expensive relative to the value provided.

Another DDR expansion scheme includes chipsets that expand the amount of memory that can be controlled by an existing memory controller. The chipset solutions stretch DDR timing to limits, add power, and do not provide extreme levels of scaling in terms of memory radius. As used herein, the term "memory radius" means an amount of memory that can be attached to a particular entity. Scaling using the chipset solution is limited by the amount of memory that can be packaged with a required proximity to the memory controller.

A drawback of the DDR expansion schemes outlined above is that they cannot be configured at boot time for one ratio, and then changed to another ratio on the next boot.

Another solution for memory expansion is to build a mainframe computer. Mainframe computers run multiple users and multiple jobs, and can allocate memory based upon needs. A drawback of mainframe computers is that they are generally expensive, and the total size of the memory expansion is limited.

I/O connected memory may be used as a memory expansion technique. I/O connected memory is expansion memory that connects to servers via software calls to I/O. However, high latency associated with software calls to I/O generally limits the value of I/O connected memory as a solution for memory expansion.

A link-based memory expansion approach uses CPU links to electronically or photonically connect a server to remote memory. However, the connection is point-to-point; thus the link-based memory expansion connects one processor to one memory unit. Link-based memory expansion does not address flexibly sharing a pool of memory resources between multiple servers.

A link-based memory expansion with an electronic packet switch approach overcomes the limitations of the point-to-point network by adding an electronic packet switch. However, a packet switch typically adds tens of nanoseconds of latency and consumes significant power. The high-speed link must be slowed and re-clocked to match the core frequency of the switch, routed, then re-clocked to the high-speed output path. A hierarchy of these switches adds hundreds of nanoseconds of latency, as sequential hops penalize performance.

A computer system with a photonically-attached memory expansion appliance is disclosed herein. Embodiments of the computer system provide the ability to change which memory domains are available to which servers at a configuration event. The system uses a native CPU link to a remote node, and allows adding nodes within the limits of the CPU architecture. The memory that can be attached per node is not fundamentally constrained as described above with memory attached to CPUs, since the CPU links can be allocated to serve many more memory busses per node than per processor. Thus, large amounts of memory may be allocated to a memory intensive process on a CPU for an application (for example, searching a large database), while an application that requires less memory will have an appropriate amount allocated to it on an other CPU (for example, word processing). On a different occasion, different amounts of memory may be allocated to the CPU and the other CPU. Reconfiguring the memory allocated to a CPU from a pool of memory may be an efficient use of memory. In contrast, other computer systems may permanently allocate a large amount of memory to each CPU to provide capability to perform memory intensive operations when required, but much of the memory would be under-used during operations that do not require much memory. Costs associated with procurement of the additional memory and power consumption incurred by unused memory are inefficiencies that may be overcome with embodiments of the present disclosure.

Embodiments of the computer system of the present disclosure enable the use of relatively inexpensive, industry-standard servers. The configurable memory resource pool can be allocated to meet customer and application needs. The disclosed computer system may be particularly useful for search applications and cloud architectures.

Figure 1:
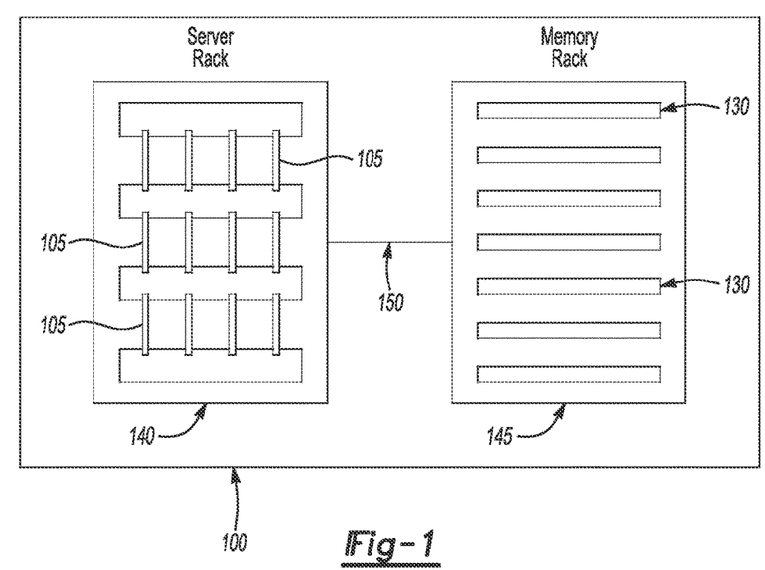
FIG. 1 is a schematic representation of a computer system according to an embodiment of the present disclosure.

Referring now to FIG. 1, an embodiment of a computer system 100 is depicted. The computer system includes a server rack 140 and a memory rack 145 having a photonic interconnection 150 therebetween. The server rack 140 includes a plurality of computer servers 105 operatively disposed in the server rack 140. The memory rack 145 includes one or more memory appliances 130. Although FIG. 1 depicts a multi-rack embodiment of the present disclosure, it is to be understood that the memory appliance 130 and computer servers 105 may be housed within the same rack (not shown).

Figure 2:
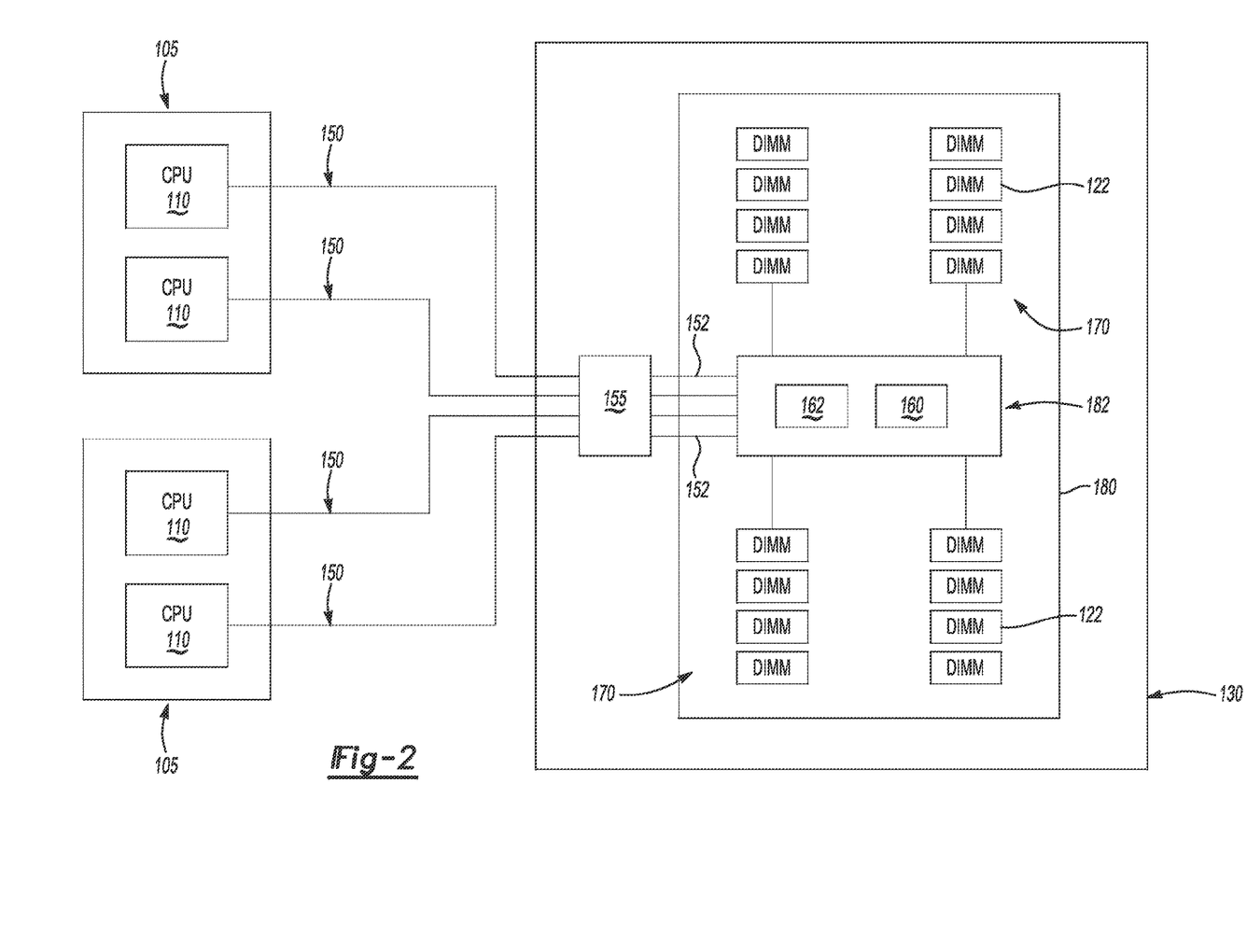
FIG. 2 is a schematic representation of embodiments of additional aspects of the computer system shown in FIG. 1.

FIG. 2 shows further aspects of the embodiment of the computer system 100 depicted in FIG. 1, Each computer server 105 includes at least one central processing unit (CPU) 110 operatively disposed therein. A memory appliance 130 is spaced remotely from the plurality of computer servers 105 and includes a memory controller 160 and random access memory (RAM) 170 operatively disposed in the memory appliance 130. At least one photonic interconnection 150 connects the plurality of computer servers 105 and the memory appliance 130. Further, although FIG. 2 does not show this configuration, it is to be understood that two or more photonic interconnections 150 may connect each CPU 110 to the memory appliance 130 for bandwidth, redundancy, and latency considerations.

In an embodiment, an allocated portion of the RAM 170 is addressable by a predetermined CPU 110 selected during a configuration event from the plurality of CPUs 110 disposed in the plurality of computer servers 105. The selected CPU 110 may be selected based on many factors, e.g., the programs that need to be executed in the computer, database size, the size of the calculation task, etc. For example, a CPU 110 may be allocated a large portion of RAM 170 to search large databases. In another example, a maximum allocated portion of the RAM 170 addressable by the predetermined CPU 110 is about 100 percent of the RAM 170 operatively disposed in the memory appliance. In yet another example, a ratio of a maximum allocated portion of the RAM 170 to CPU cores is at least about 64 GB/core in the predetermined CPU 110.

It is to be understood that all of the CPUs 110 have some level of native memory. As used herein, portions of the RAM 170 allocated during configuration events are disposed hi the memory appliance 130 separate from, and in addition to the native CPU memory.

The allocated portion of the RAM 170 is established and maintained throughout operations of the computer system 100 until a subsequent configuration event. It is to be understood that establishing an allocated portion of RAM 170 means that a particular range (not shown) of memory locations in the RAM 170 is designated for the exclusive use of a particular CPU 110, and the exclusive allocation does not change (i.e., is maintained throughout operations) until a subsequent configuration event. A configuration event may be a boot operation, or similar event determined by the operating system, hypervisior appliance firmware, or other control means.

As also shown in FIG. 2, the RAM 170 may be in the form of DIMMs 122, which may be organized in a manner related to specific DDR busses. It is to be understood that other forms of RAM 170 may also be used, including but not limited to memory platters, memory cards, stacked DRAM packages, phase-change memory, and memristor-based memory.

Figure 3:
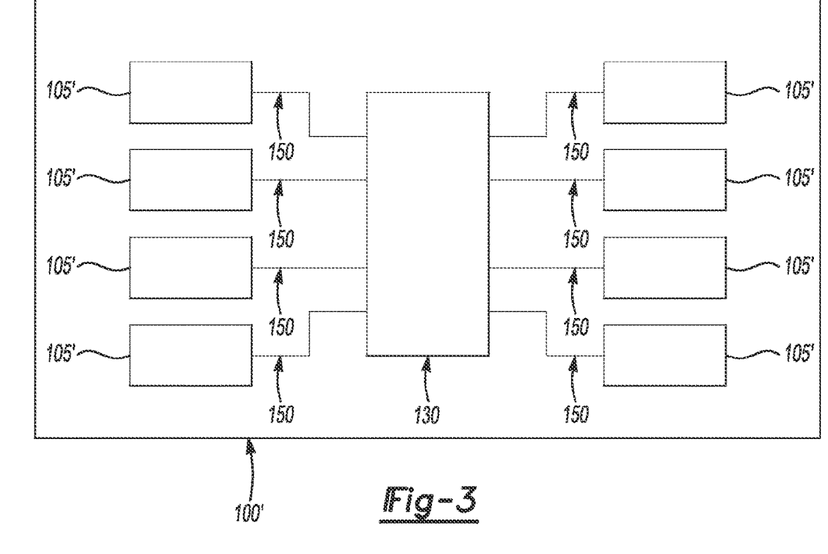
FIG. 3 is a schematic representation of another embodiment of a computer system according to the present disclosure.

Referring now to FIG. 3, an embodiment of a computer system 100' has a plurality of computer servers 105' operatively connected to a memory appliance 130 via photonic interconnections 150. In the embodiment depicted in FIG. 3, the computer servers 105' are dual-socket servers. It is to be understood that a dual-socket server includes two CPUs 110 (CPUs not shown in FIG. 3 for clarity). It is to be further understood that other embodiments of the computer server may include more CPUs 110 than described above, and other embodiments of the computer system may include more computer servers 105' than shown in FIG. 3. For example, in an embodiment, each of the plurality of computer servers may include more than eight CPUs. In a non-limiting example, a computer system 100, 100' may include 1024 CPUs.

Figure 4:
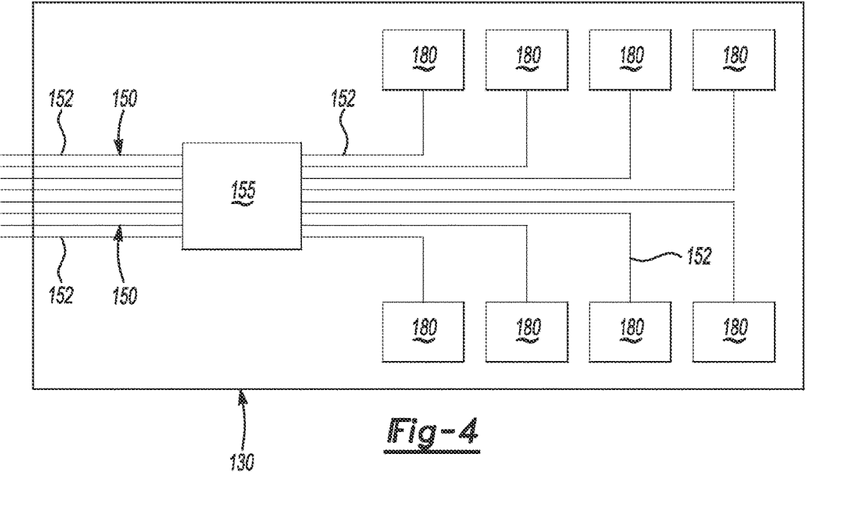
FIG. 4 is a schematic representation of an embodiment of a memory appliance according to an embodiment of the present disclosure.
Figure 5:
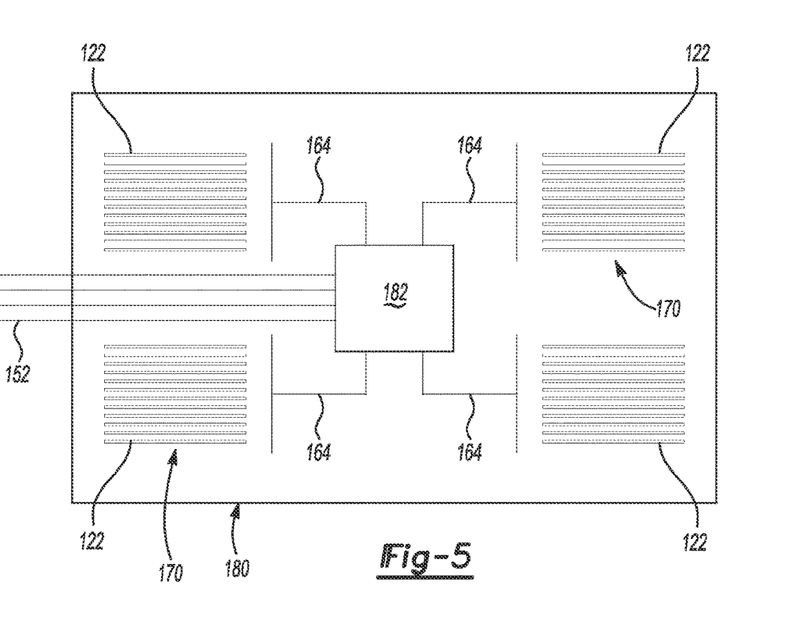
FIG. 5 is a schematic representation of an embodiment of a link-attached memory domain according to an embodiment of the present disclosure.

FIG. 4 depicts the photonic interconnections 150 connecting CPU links 152 to the memory appliance 130. A switching device 155 connects the CPU links 152 to link-attached memory domains 180. FIG. 5 shows an individual link-attached memory domain 180 including an integrated circuit (IC) chip 182. IC chip 182 is configured to function as a memory controller 160 and as a CPU-link-to-DDR communications chip 162 (as shown in FIG. 2). The DIMMs 122 communicate via a DDR bus 164, thereby completing the path between the CPU 110 and RAM 170 (as seen in FIGS. 2, 4 and 5 together).

Figure 6:
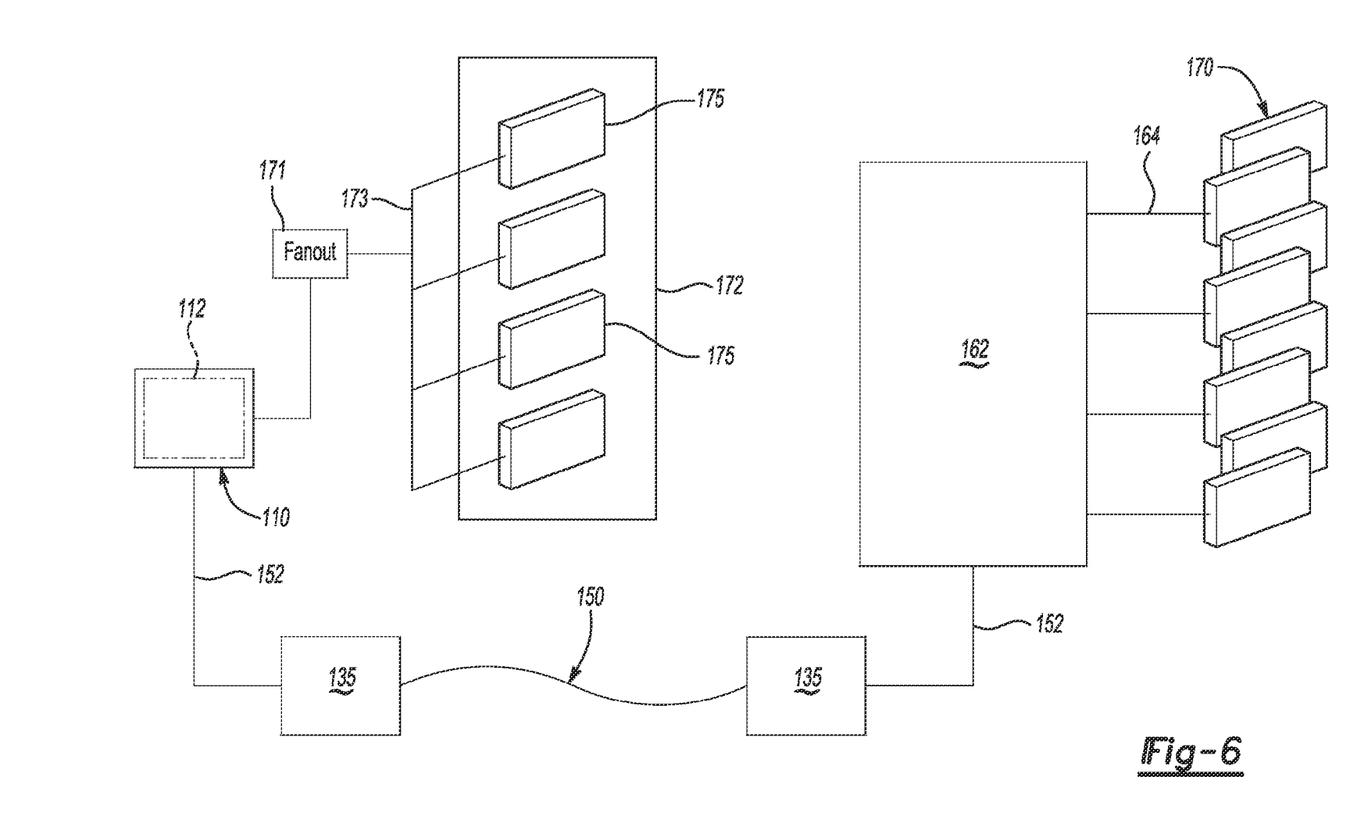
FIG. 6 is a schematic representation of an embodiment of a communications path from CPU to RAM according to an embodiment of the disclosure.

FIG. 6 shows a schematic view of a communications path from a CPU 110 to RAM 170 in an embodiment of the present disclosure. All the CPUs 110 include at least one CPU core 112 (shown schematically in FIG. 6). CPU 110 is connected via fanout 171 on a local bus 173 to memory modules 175 within local memory 172. A CPU link 152 is connected to a converter 135 that converts an electronic CPU link signal to a photonic CPU link signal that is carried by a photonic interconnection 150 to another converter 135 that converts the CPU link signal from a photonic CPU link signal to an electronic CPU link signal. It is to be understood that, as used herein, a photonic interconnection 150 may include more than one optical path. For example, more than one optical fiber (not shown) may be included in photonic interconnection 150. It is to be further understood that the communication across the photonic interconnection 150 may be bidirectional (i.e., one optical fiber communicates in one direction, and another optical fiber communicates in an opposite direction), therefore the converters 135 convert photonic to electronic signals and electronic to photonic signals. CPU-link-to-DDR communications chip 162 connects the CPU links 152 to RAM 170 via DDR bus 164. It is to be understood that the photonic interconnection 150 may include a light transmitting (optical) fiber, couplings (not shown), and converters 135. Photonic interconnection 150 allows RAM 170 to be located at a greater distance from the CPU 110 compared to electronic interconnection without high transport delay times associated with multiple-chip hops and with excellent signal to noise properties. It is to be understood that the product of the speed of light and the length of the fiber continues to be a source of transport delay, but not a significant transport delay at the communication radius disclosed herein. Thus, an embodiment of the disclosure may have a communication radius ranging from about 1 meter to about 10 meters. As shown in FIG. 1, this communication radius allows the memory appliance(s) 130 to be disposed in a memory rack 145 spaced apart from a server rack 140 without performance issues related to transport time until the length of the fiber is such that the product of the speed of light and the length of the fiber becomes a significant part of the delay. The communication radius disclosed in the present disclosure may be one or two orders of magnitude greater than a DDR2 or DDR3 communication radius.

Figure 7:
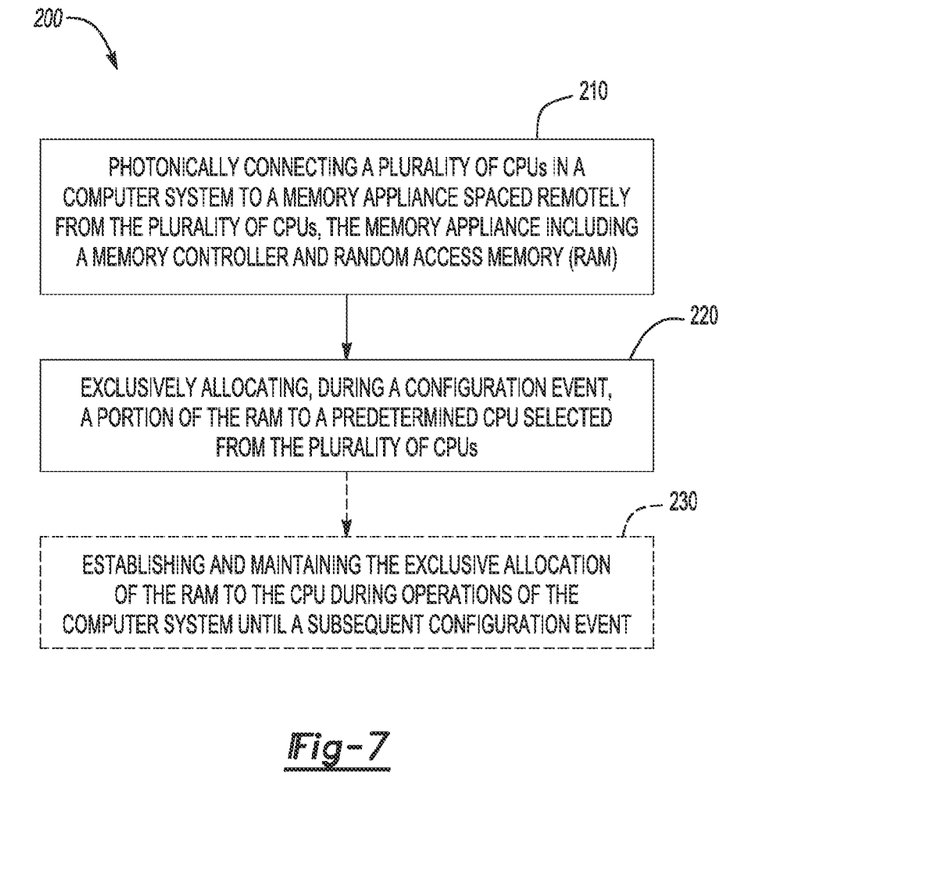
FIG. 7 is a schematic process flow diagram of embodiments of the method of the present disclosure.

FIG. 7 depicts a method 200 for sharing computer memory in a computer system having a plurality of Central Processing Units (CPUs). An embodiment of the method 200 includes photonically connecting the plurality of CPUs to a memory appliance spaced remotely from the plurality of CPUs, the memory appliance having a memory controller and random access memory (RAM) operatively disposed therein, as depicted at reference numeral 210. Method 200 further includes exclusively allocating, during a configuration event, a portion of the RAM to a predetermined CPU selected from the plurality of CPUs, as depicted at reference numeral 220.

In an embodiment, the method 200 may further include establishing and maintaining the exclusive allocation of the RAM to the CPU during operations of the computer system until a subsequent configuration event, as depicted at reference numeral 230.

It is to be understood that as used herein, spaced remotely from the plurality of CPUs means the memory appliance(s) 130 are spaced apart from the plurality of CPUs by a distance ranging from about 1 meter to about 10 meters.

According to the embodiments herein, a total amount of RAM operatively disposed in the memory appliances 130 of the computer system 100 in Gigabytes divided by a total number of CPU cores in the plurality of computer servers is at least about 64 GB/core. In another embodiment, the total RAM to CPU core ratio is 256 GB/core. In yet another embodiment, the total RAM to CPU core ratio is 2000 GB/core. It is to be understood that the example total RAM to CPU core ratios above are not intended to imply a uniform allocation of RAM 170 to all of the CPUs 110 in the servers 105 in the computer system 100, although the CPUs 110 may be so uniformly provisioned, if desired. In embodiments disclosed herein, the RAM 170 allocation may be skewed such that a large amount of memory (of the total RAM 170 available) is allocated to one or more CPUs 110, with the remaining amount of memory (of the total RAM 170 available) being allocated as desired to the remaining CPUs 110.

Each of the plurality of computer servers in the embodiments herein may be dual-socket servers. In another embodiment, the computer servers may include between one and eight CPUs. It is to be understood that more than one CPU core may be operatively disposed on a single chip (i.e., dual-core and quad-core processors).

It is to be understood that embodiments of the present disclosure are not limited to the native capacity provided by a CPU memory controller. For example, a CPU having four DDR busses with four DIMMs each would have a maximum native capacity of 4×4×(DIMM capacity). If the DIMM capacity were 8 GB, the maximum native capacity would be 4×4×8=128 GB. Carrying forward with the same example, if the CPU has 8 cores, the memory per core would be 128 GB/8=16 GB. If the CPU in the example were part of an 8-way SMP, the maximum memory would be 1024 GB, but the RAM to CPU core ratio would still be 16 GB/core.

In another example of memory limited by the native capacity of the CPU memory controller, a Beckton CPU having 8 cores can control 16 DIMMs. If the DIMMs are 8 GB DIMMs, then the ratio of RAM to CPU cores is 16 GB/core.

In contrast, embodiments of the present disclosure could make all of the RAM 170 available to a single server 105. As such, if the memory appliance 130 supports 128 DIMMs 122, then the total RAM/CPU core ratio is (128 DIMMs×8 GB/DIMM)/(8 cores/CPU×2 CPUs)=64 GB/core. It is to be understood that if the memory appliance 130 supports more DIMMs 122, the ratio of RAM to CPU cores will be greater.

Further, as mentioned above, in embodiments of the present disclosure, a maximum allocated portion of the RAM 170 addressable by the predetermined CPU 110 is about 100 percent of the RAM 170 operatively disposed in the memory appliance(s) 130. It is to be understood that if the predetermined CPU 110 is allocated 100 percent of the RAM 170 from the memory appliance(s) 130, the remaining CPUs 110 will receive no additional memory from the memory appliance(s) 130 until a subsequent re-allocation at a subsequent configuration event.

The RAM 170 may be double data rate (DDR) RAM. Other forms of RAM 170 are also contemplated as being within the purview of the present disclosure, including but not limited to memory platters, memory cards, stacked DRAM packages, phase-change memory, and memristor-based memory.

It is to be understood that the terms "attached/attaches/attaching to," "connected/connects/connecting to," are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "attached to" or "connected/ing to" the other component is somehow in operative communication with the other component (notwithstanding the presence of one or more additional components therebetween).

While several embodiments have been described in detail, it will be apparent to those skilled in the art that the disclosed embodiments may be modified. Therefore, the foregoing description is to be considered non-limiting.

What is claimed is:
1. A computer system, comprising:
a plurality of computer servers, each computer server including at least one central processing unit (CPU);
a memory appliance spaced remotely from the plurality of computer servers;
a memory controller and a random access memory (RAM) operatively disposed in the memory appliance; and at least one photonic interconnection between the plurality of computer servers and the memory appliance, the at least one photonic interconnection having a length between one and ten meters;

wherein the at least one CPU of each computer server is coupled to the memory controller via one of a plurality of native CPU links and the at least one photonic interconnection, wherein an allocated portion of the RAM is addressable by a predetermined CPU selected during a configuration event from the plurality of computer servers having the at least one CPU, wherein the memory controller is to select the predetermined CPU for addressing the allocated portion of the RAM based upon a size of a calculation task of the predetermined CPU, wherein the allocated portion of the RAM addressable by the predetermined CPU is changeable at a subsequent configuration event, and wherein the allocated portion of the RAM is established and maintained throughout operations of the computer system until the subsequent configuration event.

2. The computer system as defined in claim 1 wherein a ratio of a total amount of RAM operatively disposed in the memory appliance in Gigabytes divided by a total number of CPU cores in the plurality of computer servers is at least 64 GB/core.

3. The computer system as defined in claim 1 wherein a maximum allocated portion of the RAM addressable by the predetermined CPU is 100 percent of the RAM operatively disposed in the memory appliance.

4. The computer system as defined in claim 1 wherein a ratio of a maximum allocated portion of the RAM to CPU cores is at least 64 GB/core in the predetermined CPU.

5. The computer system as defined in claim 1 wherein each of the plurality of computer servers is a dual-socket server.

6. The computer system as defined in claim 1 wherein the random access memory (RAM) is a double data rate (DDR) RAM.

7. The computer system as defined in claim 1 wherein the plurality of computer servers includes more than eight CPUs.

8. A method for sharing computer memory in a computer system having a plurality of Central Processing Units (CPUs), the method comprising:

photonically connecting the plurality of CPUs to a memory appliance spaced remotely from the plurality of CPUs via at least one photonic interconnection, the at least one photonic interconnection having a length between one and ten meters, the memory appliance having a memory controller and a random access memory (RAM) operatively disposed therein, wherein each of the plurality of CPUs is coupled to the memory controller via one of a plurality of native CPU links and the at least one photonic interconnection;

exclusively allocating, during a configuration event, a portion of the RAM to a predetermined CPU selected from the plurality of CPUs, wherein the memory controller is to select the predetermined CPU to be exclusively allocated the portion of the RAM based upon a size of a calculation task of the predetermined CPU;

maintaining an exclusive allocation of the portion of the RAM to the predetermined CPU during operations of the computer system until a subsequent configuration event; and changing the portion of the RAM that is allocated to the predetermined CPU at the subsequent configuration event.

9. The method as defined in claim 8 wherein a maximum allocated portion of the RAM in Gigabytes divided by a total number of CPU cores in the predetermined CPU is at least 64 GB/core.

10. The method as defined in claim 8 wherein at least one of the plurality of CPUs is deployed in a dual-socket server.

11. The method as defined in claim 8 wherein the random access memory (RAM) is a double data rate (DDR) RAM.

* * * * *